United States Patent
Wine (10) Patent No.: US 8,686,947 B2
(45) Date of Patent: Apr. 1, 2014

(54) FINGER KEYPAD SYSTEM AND METHOD

(75) Inventor: Jonathan Wine, Lakeside, CA (US)

(73) Assignee: KYOCERA Corporation, Kyoto (JP)

(*) Notice: Subject to any disclaimer, the term of this patent is extended or adjusted under 35 U.S.C. 154(b) by 167 days.

(21) Appl. No.: 13/289,734

(22) Filed: Nov. 4, 2011

(65) Prior Publication Data
US 2013/0113709 A1    May 9, 2013

(51) Int. Cl.
*G06F 3/02* (2006.01)

(52) U.S. Cl.
USPC ........................................................ 345/169

(58) Field of Classification Search
CPC ...................................................... G06F 3/02
USPC ................................................ 345/169, 168
See application file for complete search history.

(56) References Cited

U.S. PATENT DOCUMENTS

| | | | |
|---|---|---|---|
| 7,522,937 B2* | 4/2009 | Tanaka | 455/550.1 |
| 2002/0126026 A1* | 9/2002 | Lee et al. | 341/22 |
| 2006/0030375 A1* | 2/2006 | Tanaka | 455/575.1 |

* cited by examiner

*Primary Examiner* — Fred Tzeng (57) ABSTRACT

Systems and methods for creating a finger keypad using the twelve finger segments of the human hand as a 12-key keypad are presented. In one embodiment, the finger segments are each associated with respective successive keys of a 12-key keypad, and a sensor device worn on the thumb or the wrist detects the thumb of the hand tapping on a selected finger segment and produces an output signal which varies based on which finger segment is tapped. A processor associated with the sensor device converts the output signals to corresponding 12-key values, and the 12-key values are converted to corresponding alpha-numeric values.

20 Claims, 8 Drawing Sheets

FINGER KEYPAD SYSTEM AND METHOD

BACKGROUND

1. Field of the Invention

The invention relates generally to wireless communication systems, and is particularly concerned with a system and method for text entry on a mobile device such as a smart phone or tablet computer.

2. Related Art

Multi-tap is a text entry system used on older mobile phones which have a twelve key alphanumeric phone entry keypad. Such keypads have twelve keys for entry of numbers 1 to 9 and zero, as well as symbol keys "*" and "#", with numbers from 2 to 9 also representing groups of three or four letters. This standard keypad is well known on all types of phones. It is used on non-smart cell phones for text entry, either in a multi-tap system where the letter keys are tapped once, twice or more times to obtain the desired letter in text, or in a predictive system where the device itself has a processor configured to predict word entry based on the combination of keys entered in sequence.

In a multi-tap 12-key entry system, the user presses the same key repeatedly to cycle through the letters on that key. In a predictive 12-key entry system, the user presses keys in sequence and the processor predicts the word entered based on the combination of keys. Smart phones now incorporate a mini "Qwerty" keyboard for users to type in text. One problem with text entry on smart phones is that the user needs two hands, one to hold the phone while the other presses the keys on the phone. It is difficult to enter text at high speed on such devices, since it is difficult to simultaneously look at the output on the mobile phone display screen while entering an input on the keys on the phone itself, particularly if the user is carrying other items or pushing a shopping cart, for example.

There have been some attempts to allow for text entry without having to hold the phone or tablet while entering text on the keyboard of the mobile device, but this typically involves cumbersome systems with a 26 key "Qwerty" keypad on a glove with wiring extending to a wrist worn device. This is uncomfortable and obtrusive, and impedes normal use of the hand.

Therefore, what is needed is a system and method that overcomes these significant problems found in the conventional systems as described above.

SUMMARY

It is an object of this invention to provide a new and improved system and method for text entry on a mobile device such as a cell phone or tablet computer.

In one aspect, a finger keypad input system using the twelve segments of the human fingers to represent the 12 keys of a 12-key keypad is provided. The system comprises a wearable keypad entry device configured for releasable attachment to a user's thumb, wrist, or any other position in the vicinity of the fingers and having a sensor device which detects the thumb tapping on respective segments of the user's four fingers and which is configured to produce a sensor output signal which varies depending on which finger and finger segment is tapped, and a processor unit which associates each sensor output with a respective key of a 12-key keypad and produces a corresponding 12-key value output, and converts the 12-key value to a corresponding alphanumeric output signal. In one embodiment, the system may be designed to convert 12-key values to alphanumeric values based on a 12 key multi-tap input, and in this alternative an alphanumeric output is determined based on how many times the same finger segment is tapped within a predetermined time period. In an alternative embodiment, the system may be a predictive system where the software is configured to predict word entry based on the combination of 12-key values entered in sequence, avoiding the need for the user to tap a key multiple times for some letters.

A transmitter unit is associated with the processor unit and configured to transmit the alphanumeric output signal to a mobile phone or other wireless device such as a tablet for conversion to text on a display.

In one embodiment, the three segments of the first finger of a user's hand represent numbers 1 to 3 of an alphanumeric keypad, the next finger represents numbers 4 to 6, and so on, with the fourth finger representing symbol "*", number zero, and symbol "#". With this arrangement, if the keypad input system is a multi-tap system, the user can enter the word "hello" by tapping the first segment of the second finger (number 4, letters GHI) twice for the letter H, tapping the third segment of the first finger (number 3, letters DEF) twice for the letter E, tapping the second segment of the second finger (number 5, letters JKL) three times for the letter L, twice in succession, and then tapping the third segment of the second finger (number 6, letters MNO) three times for the letter O. If the input system is based on predictive analysis, the user taps each finger segment only once for each letter and the processor unit is configured to predict words based on the sequence of 12-key values tapped in by the user.

In one embodiment, flags for each key may be applied to the finger segments by attachment directly to the skin, for example as temporary tattoos, or may be provided on a glove which the user wears while entering text. The flags may have physical characteristics which vary from flag to flag. The sensor unit may be secured to the user's thumb so that it can detect the proximity of the sensor device to any finger key or flag and produce the corresponding sensor output signal based on a detected characteristic. In one embodiment, the sensor device is a color sensor and the keys are different color flags applied to the finger segments, which may be applied as temporary tattoos. In another embodiment, a magnetic sensor may be used.

In alternative embodiments, the fingers may be completely unmarked and the sensor device may be any suitable device which can discriminate between thumb taps on the different finger segments by detection of physiological characteristics which result from the thumb tapping different fingers, such as a biometric sensor, an acoustic array which detects the sound of the thumb hitting fingers or the sound of tendon movement, electrodes for detecting myoelectric muscle signals in a similar way to modern prosthetics, a capacitive sensor, a piezoelectric sensor, a camera for analysis of thumb and finger movement, or the like.

In one embodiment, a display screen may be attached to the user's wrist or the like and displays the text as the user types on the finger keypad.

According to another aspect, a method of text entry using the human fingers to represent a 12 key keypad is provided. In one embodiment, the finger segments are each associated with respective successive keys of a 12-key keypad, and a sensor device worn on the thumb or in the vicinity of the thumb detects the thumb of the hand tapping on a selected finger segment and produces an output signal which varies based on which finger segment is tapped. The output signal is converted to the corresponding 12-key value for the tapped finger segment and a corresponding alpha-numeric value is determined either with a predictive analysis in a predictive system or is based on how many successive taps of the same finger segment are detected in a multi-tap system.

This method allows for one handed text entry without looking at the keys. The user can enter text at high speed in any location, whether standing up, moving, or sitting. While typing by tapping finger segments with their thumb, they can look at the output on a display rather looking at the input device. Key labels may be provided for use on the fingers until the user learns the key locations, and input speed increases over time can be expected as the finger segment key positions are learned, as with any keyboard learning system. This allows texting to become a seamless extension of the user's daily routine. The user can conveniently respond to incoming text messages without touching their phone. Since wireless communication to a remote device can take place without touching a phone, a larger, more tablet like device than conventional mobile phones can be used for receiving and storing the text input, since the text receiving device does not need to be carried in a quickly accessible manner. This is ideal for the professional or student who wants to travel light (i.e. not carry a laptop), yet have typed notes without the need for later transcription. The individual can communicate with a mobile device, laptop, or the like at a different location by use of the finger keypad, and proceed to quickly enter notes during a conference, lecture or the like using only one hand as a finger keypad and entry device.

The finger keypad system and method is particularly suitable for use by the younger generation of teens and twenties. Many in this group can have multiple text conversations at the same time, as well as real-time updating of Facebook®, Twitter®, or other social networks. This system provides the user who prefers to communicate via text with an equivalent of similar convenience to the Bluetooth® handsfree headset for voice communication.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems, devices and methods of using the twelve finger segments of the human hand as a 12-key keypad for text entry on a mobile phone or the like without using a keyboard on the mobile device itself.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1A:
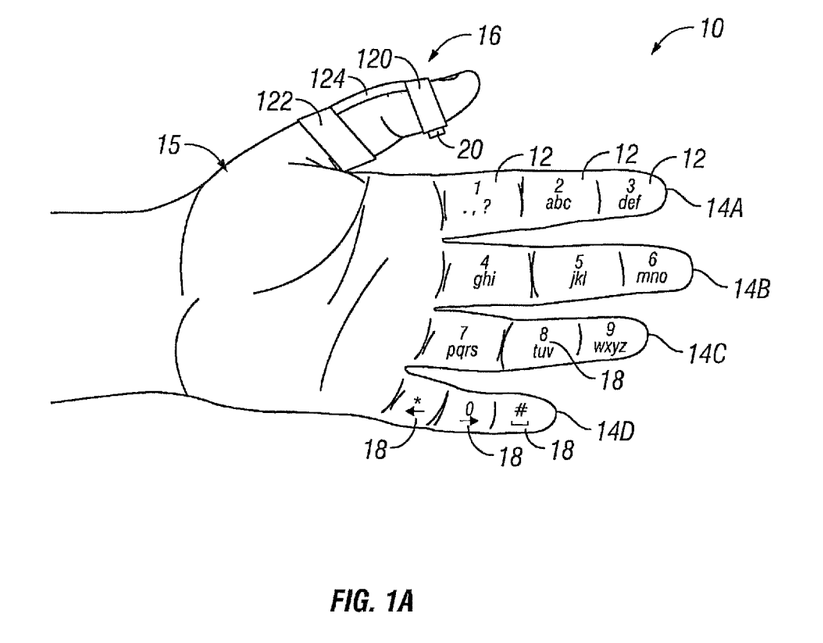
FIG. 1A illustrates one embodiment of a finger keypad system which uses the human finger segments of the hand as a 12-key keypad using a wearable keypad entry device on the thumb to tap the keys.
Figure 1B:
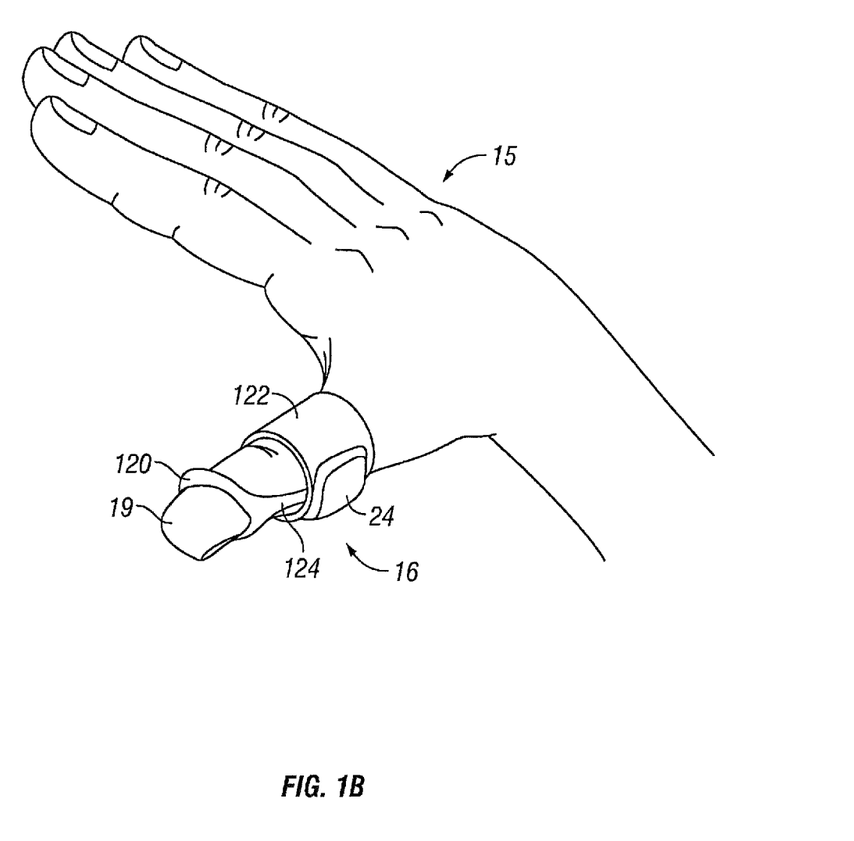
FIG. 1B is an illustration of the system of FIG. 1A with the thumb in a different position to illustrate the thumb-worn finger keypad entry device in more detail.

FIGS. 1A and 1B illustrate one embodiment of a finger keypad system 10 in which the three finger segments 12 of each finger 14A, 14B, 14C, 14D of a human hand 15 are used to represent the twelve keys of a 12 key keypad, with a wearable keypad entry device 16 worn on the thumb used to tap the finger segments in sequence in order to enter a desired number or text. Although indicia corresponding to actual phone key markings are shown on the fingers in FIG. 1A for ease in explaining the operation of the finger keypad, it will be understood that this is optional and simpler indicia, or no indicia at all, may be used in alternative embodiments.

In the illustrated embodiment, the thumb-wearable finger keypad entry device or receptor device 16 includes a sensor module or device 20 and a control or processing unit 24 in communication with sensor device 20, both carried on a thumb mountable member or structure. The sensor device 20 of this embodiment is designed to be tapped against actual keys or indicia 18 on the respective finger segments, and the control unit is configured to receive the sensor output and produce a corresponding alphanumeric value output, as described in more detail below. In the illustrated embodiment, wearable entry device 16 is designed to slide onto the user's thumb, and is comfortable and unobtrusive enough to be worn at all times, so that the user is prepared to respond to incoming text messages and the like.

As illustrated in FIGS. 1A and 1B, the thumb mountable member or structure of wearable entry device 16 comprises a first sleeve or ring 120 which carries sensor device 20, and a second, larger sleeve or ring 122 which carries the control or processing unit 24 and which is joined to sleeve 120 by flexible connecting strip 124. In one embodiment, the rings and connecting strip are formed in one piece of flexible plastic material or the like, with suitable conductive leads extending through strip 124 and rings for communication between sensor device 20 and control unit 24. As described in more detail below, electronic control or processing unit 24 receives the output of sensor device 20 and transmits a corresponding text output to a remote wireless communication device. Larger ring 122 is designed to be worn at the base of the thumb, while the smaller ring 120 is located close to the tip of the thumb with sensor device 20 facing inwards for tapping against the finger segments, as illustrated in FIGS. 1A and 1B. The ring 120 is sufficiently elastic to allow it to be pushed down to the lower part of the thumb, adjacent ring 122, when not in use, leaving the thumb free, or the device can be removed from the thumb and kept in a pocket or the like while not in use, if preferred by the user.

In alternative embodiments, other attachment devices or wearable devices such as straps, clips or the like or a glove worn by the user may be used to carry the sensor device and control unit. In other embodiments, depending on the sensing system used to distinguish between the finger segments, the control unit and sensor device may be attached to the wrist or other area and the sensor device need not directly touch the finger segments to produce an output. Additionally, in some embodiments the fingers may be completely unmarked, and the receptor device detects which finger segment is tapped by the thumb based on various physiological or physical characteristics of such taps, such as actual thumb movement, acoustic output signals, muscle signals, tendon movement, electrical resistance, changes in capacitance, biometric differences, and the like, as described in more detail below.

The twelve keys of the keypad in one embodiment are represented by the three segments of the fingers 14 as follows (see FIG. 1):
First finger 14A, first to third segment:
Keys 1 (., ?), 2 (ABC), 3 (DEF);
Second finger 14B, first to third segment:
Keys 4 (GHI), 5 (JKL), 6 (M, N, O);
Third finger 14C, first to third segment:
Keys 7 (PQRS), 8 (TUV), 9 (WXYZ);
Fourth finger 14D, first to third segment:
Keys *, 0, # (backspace, next, and space).

FIG. 1A illustrates the fingers of the left hand used to represent a 12-key keypad. However, the fingers of the right hand may alternatively be used as the keypad. In this case, the segments are reversed with the key segments at the tip of the fingers associated with keys 1, 4, 7 and "*", and the keys at the base of the fingers associated with keys 3, 6, 9 and "#", respectively, so that the keys read correctly in sequence from left to right along each finger. Although the actual key markings are shown on the finger segments in FIG. 1A, this is for illustration purposes only and in practice only small markers for activating sensor device 20 to distinguish between the finger segments may be used for "keys" 18, or in some cases no markings are required on the finger segments at all, and only the thumb worn device 16 is needed to generate the finger keypad output, as described in more detail below.

Optional key labels with the corresponding key indicia may initially be placed on the respective finger segments, until the user learns the key locations and can use "muscle memory" for typing without looking at the keys. In one embodiment, markings or devices which can be distinguished from one another and detected by sensor device 20 are temporarily applied to the finger segments in any suitable manner. In one embodiment, the different keys are different color spots or key flags on the respective finger segments, and the receptor device 16 includes an RGBC (red, green, blue, clear) color sensor 20 (see FIG. 2) to detect the color of the key which is tapped by the receptor device on the user's thumb.

Figure 2:
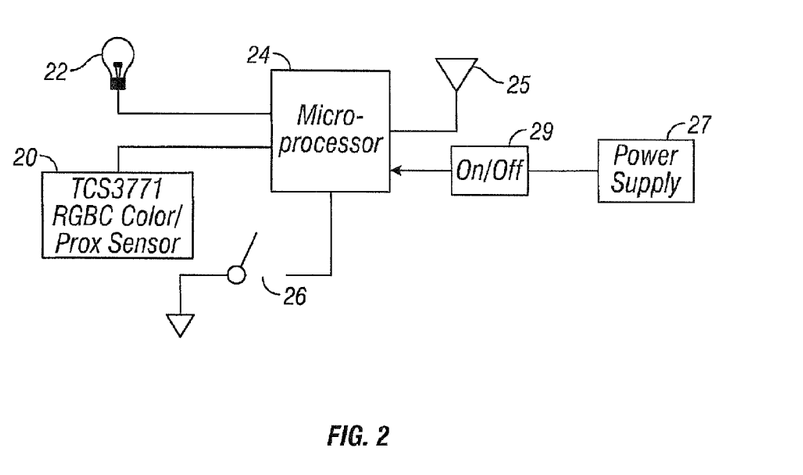
FIG. 2 is a block diagram illustrating one embodiment of the thumb-mounted sensor and processor unit of the thumb-worn entry device of FIGS. 1A and 1B.

FIG. 2 illustrates one embodiment of the sensor device and control unit of the thumb-wearable device 16 of FIG. 1 in more detail. As illustrated in FIG. 2, the device 16 includes color sensor or sensor device 20, a light source 22 such as a white light LED located adjacent the sensor for illuminating the color key as the thumb and sensor approach a finger segment, a microprocessor or processor unit 24 which receives the output of sensor 20 and converts it into a 12 key value output corresponding to the detected color key and then into the corresponding alphanumeric value, and a wireless transmitter with antenna 25 such as a Bluetooth antenna which receives the output of microprocessor 24 and transmits the output signal to a wireless communication device, as described in more detail below in connection with FIG. 4.

In the embodiment illustrated in the drawings below, the processor unit is configured as a multi-tap processing device in which 12 key values are converted into corresponding alphanumeric values based on whether the same finger segment is tapped only once or multiple times. However, it will be understood that the processor unit could alternatively be configured as a predictive system configured to predict word entry based on taps of finger segments in sequence, where each finger segment is tapped only once, using commercially available predictive text technology such as T9, eZi or the like. Alternatively, the processor unit may be configured to operate in multiple modes, the modes comprising at least multi-tap key handling and predictive key handling, and the user can toggle between the multiple modes during text entry An optional mechanical or capacitive switch 26 may be provided in unit 16 beneath or adjacent the sensor 20, so as to produce an interrupt for each tap. This determines when a finger segment has been tapped, and also distinguishes between successive taps on the same finger key or segment. The interrupt switch may be omitted in some embodiments using a color sensor, because light is in any case blocked when the sensor and light source touch the finger, providing a momentary "blackout" which serves as an indication to processor unit 24 of a tap on a key. The color sensor 20 and light source 22, and the switch 26 if present, are secured to ring 120 on the front or inner face of the thumb, while the microprocessor 24, on/off switch 29, and power supply 27 are mounted on the ring 122 at the base of the thumb, as illustrated in FIG. 1B. This provides full freedom of movement of the thumb at the thumb joint so that the user can readily tap selected finger segments while entering text.

Figure 3:
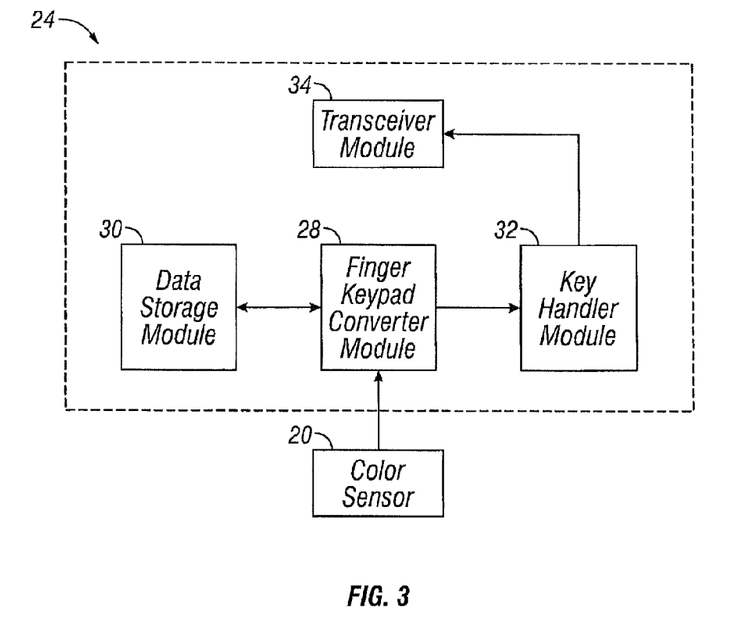
FIG. 3 is a block diagram illustrating the processor unit of FIG. 2 in more detail.

FIG. 3 illustrates the processor unit or microprocessor 24 in more detail. As illustrated, microprocessor 24 basically comprises a finger keypad converter module 28 which communicates with data storage module 30 and receives output signals from color sensor 20, a key handler module 32 linked to the converter module, and a transceiver or communication module 34 which receives the output of the key handler module 32 and transmits it via antenna 25 to a wireless communication device such as a user's mobile phone via a wireless communication link, as described in more detail below in connection with FIG. 4. Any suitable wireless communication link, such as Bluetooth, WLAN, WIFI, or the like may be used. In one embodiment, antenna 25 is a Bluetooth antenna, and transceiver module 34 is a Bluetooth HID (human interface device) module such as a BCM20730 module, manufactured by Broadcom Corporation of Irvine, Calif. A suitable power supply, battery or the like 27 is provided for providing power to the microprocessor, LED 22, and color sensor 20, along with an on-off switch 29, and may be contained in the same housing as microprocessor 24, for example. The battery may be re-chargeable with a conventional cell-phone type charger.

Any suitable color sensor may be used to detect the color keys or markings on the finger segments, such as the TCS3771 RGBC color sensor manufactured by Texas Advanced Optoelectronic Solutions, Incorporated (TAOS) of Plano, Tex. The different color keys applied to the fingers are selected to be of suitable colors represented by the ratio of red, green and blue that they contain (RGB) and sufficiently different to be readily distinguishable by the sensor, with no colors close to the human skin color. The level of each color component is represented by a decimal value between 0 and 255. In order to enable the most efficient processing, colors for the finger keypad are chosen to be as dissimilar as possible. Thus, each of the component colors red, green and blue comprising each key is of the value 0, 127, or 255. In order to avoid one color being mistaken for another in varying lighting conditions, all RGB combinations for the keys contain at least one color component with the maximum value of 255. Any twelve of the eighteen colors listed in the Table 1 below may be used for the color keys.

TABLE 1

| RED | GRN | BLU |
|---|---|---|
| 0 | 0 | 255 |
| 0 | 127 | 255 |
| 0 | 255 | 0 |
| 0 | 255 | 127 |
| 0 | 255 | 255 |
| 127 | 0 | 255 |
| 127 | 127 | 255 |
| 127 | 255 | 0 |
| 127 | 255 | 127 |
| 127 | 255 | 255 |
| 255 | 0 | 0 |
| 255 | 0 | 127 |
| 255 | 0 | 255 |
| 255 | 127 | 0 |
| 255 | 127 | 255 |
| 255 | 255 | 0 |
| 255 | 255 | 127 |
| 255 | 255 | 255 |

A table or map which maps each sensor output signal to the corresponding 12-key value associated with the respective finger segment is stored in data storage module 30 of FIG. 3 for access by the finger keypad converter module 28. In an alternative embodiment, a mapping table is not used. Instead, the colors for the keys are selected so that their RGB numbers form successively higher numeric values for keys 1 to 12, and these values are then normalized to be 1 through 12. This avoids the need for mapping a sensor output to a 12 key value, since it is derived through computation.

The color keys or key flags may be applied to the fingers as adhesive stickers, or by temporary tattoos which are directly applied as ink to the skin in the respective finger segments, or by water-slide tattoos, either of which last for about a week and allow normal use of the hands. Alternatively, a glove, finger-cots, or rings carrying the color key flags may be worn by the user to avoid applying key markings directly to the skin.

Figure 4:
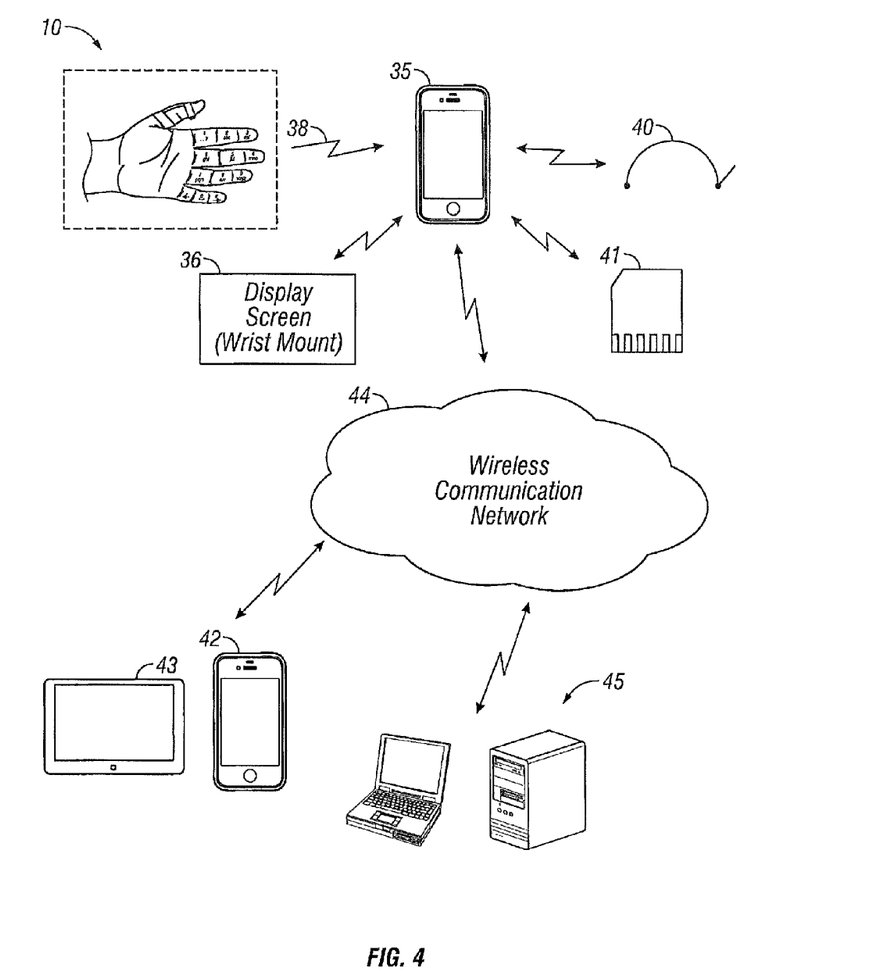
FIG. 4 is a block diagram illustrating one embodiment of a wireless communication system using the finger keypad system of FIGS. 1A to 3 as the numeric and text entry device for a wireless device in the communication system.

FIG. 4 is a block diagram illustrating one embodiment of a wireless communication system using the finger keypad 10 of FIG. 1A as an alphanumeric data or text entry device. In one embodiment, the finger keypad is associated with the user's wireless communication device, such as mobile phone 35 (which may be a smart phone with a Qwerty keypad or any other type of mobile phone), tablet computer 43, or the like. While entering numbers or text using the finger keypad, the user may view the numbers or text entered on the existing screen on the mobile phone 35. Alternatively, the entered text may be displayed on a wearable screen 36 such as a LCD (liquid crystal display) device worn on the wrist adjacent the finger keypad and configured for wireless communications via Bluetooth or the like. Some examples of suitable wearable LCD devices or display screens for use in this system are the LiveView® manufactured by Sony Ericsson or the Meta Watch® by Fossil, Inc. These devices can be worn on a wrist band for convenient viewing as the user enters text on the finger keypad. The output of key handler module 32 is transmitted to the user's phone 35 and from there to the wearable display device 36 via wireless links 38 such as Bluetooth. The user may wear a Bluetooth headset 40 for voice communications while texting, and in one embodiment an audio feedback through the headset 40 may be used to verify character-by-character or word-by-word as the text is entered, or to verify the entire message (as text-to-speech) before it is sent, rather than using wrist-mounted display device 36.

Although each network element or component in the system of FIG. 4 is capable of communicating over one or more wireless communication networks and the links between elements are wireless links, one or more links may be provided by a wired communication network in other embodiments.

In the system of FIG. 4, text messages may be sent to another phone 42 by the user via finger keypad system 10 without needing to touch mobile phone 35. The user can enter the text message using the finger keypad as described above, while viewing the entered text on display screen 36 which may be conveniently attached to their wrist via a wrist band or the like. The message is then sent to another mobile phone 42 via mobile phone 35 and wireless communication network 44, simply by using the menu functionality of display screen 36 in conjunction with the text entry functionality of the finger keypad to send the message. Incoming text messages from other mobile phones are also displayed on display screen 36 so that the user can easily read such messages on display screen 36, and enter a reply using the finger keypad, also without touching phone 35. Thus, the mobile phone 35 does not need to be carried in a quickly accessible manner or held while sending or receiving text messages, and can be left in a pocket, case or bag during such communications.

A wireless communication device used in conjunction with finger keypad 10 need not be a mobile or cellular phone, but can be any type of device capable of receiving text input. For example, device 35 may also be a personal digital assistant (PDA), a personal computer (PC), laptop computer, tablet computer, digital pen, Text-to-Speech (US) device, or other type of device with the ability to receive text input. Since the cell phone 35 of FIG. 4 does not need to be touched for common communications using the finger keypad, the wireless communication device can be larger and more tablet-like than current mobile phones, and may be kept in a briefcase or the like while not in use, without needing to be removed to send or reply to text messages and the like. This means that the mobile phone can be designed more in the form of a small tablet-like computer, and used hands-free with a Bluetooth headset such as headset 40 of FIG. 4 for voice communications, and with the finger keypad 10 for one handed text message communications.

The finger keypad system of FIGS. 1 to 4 also allows business travelers, students, and the like to travel light, without needing to carry a laptop, while still being able to enter typed notes during business meetings or lectures, using the finger keypad system 10 and either an accompanying worn display screen 36 or the screen of mobile phone 35 to view the text during entry. Notes entered in this way can be transferred to a local data storage device 41 such as an SD (secure digital) card in a mobile device or via a USB cable to a laptop or desktop computer 45, or transmitted over a network for storage on a remote device via e-mail or the like. The user therefore has the convenience of typed notes without the need for later transcription, and without needing to carry a laptop computer to meetings or lectures.

Figure 5:
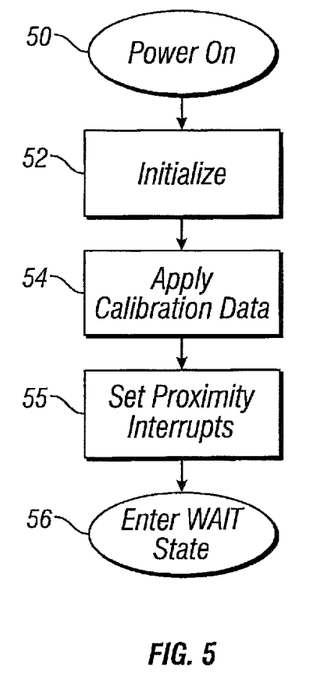
FIG. 5 is a flow diagram illustrating the power-on sequence of the sensor and processor unit of FIG. 2.
Figure 6A:
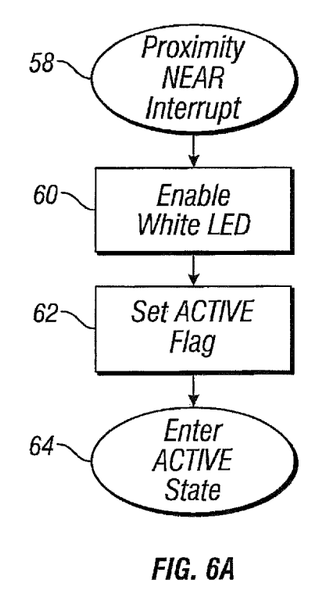
FIGS. 6A and 6B are flow diagrams illustrating a proximity NEAR and proximity FAR interrupt for the sensor and processor unit of FIGS. 2 and 3.
Figure 6B:
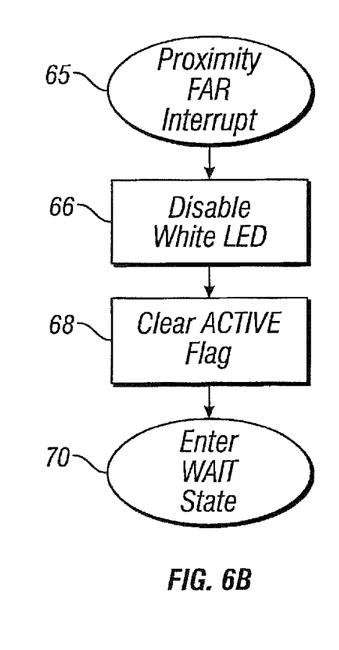

FIGS. 5 to 8 are flow diagrams illustrating operation of the finger keypad system 10 of FIGS. 1 to 4 to perform the functions described above. The finger keypad converter module 28 is programmed to carry out a power-on routine as illustrated in FIG. 5 when a user turns on the receptor unit or device 16 via a suitable on-off switch. When the power is switched on (step 50), an initialization routine is performed (52), sensor calibration data (provisioned by the factory during manufacture) is applied (54), and proximity interrupts (as provisioned by the factory) are set (55). The system then enters a WAIT state (56), awaiting a proximity NEAR input. Proximity NEAR and FAR interrupts for enabling and disabling the white LED 22 are illustrated in FIGS. 6A and 6B, respectively. A typical color/proximity sensor, such as the TAOS sensor referenced above, is able to interrupt when the proximity reading reaches an upper threshold (NEAR) or a lower threshold (FAR). After a proximity NEAR interrupt (58), the white LED 22 is enabled (60), the ACTIVE flag is set (62), and the system enters an ACTIVE state (64). After a proximity FAR interrupt (65), the white LED is disabled (66), the ACTIVE flag is cleared (68), and the system enters a WAIT state (70).

Figure 7:
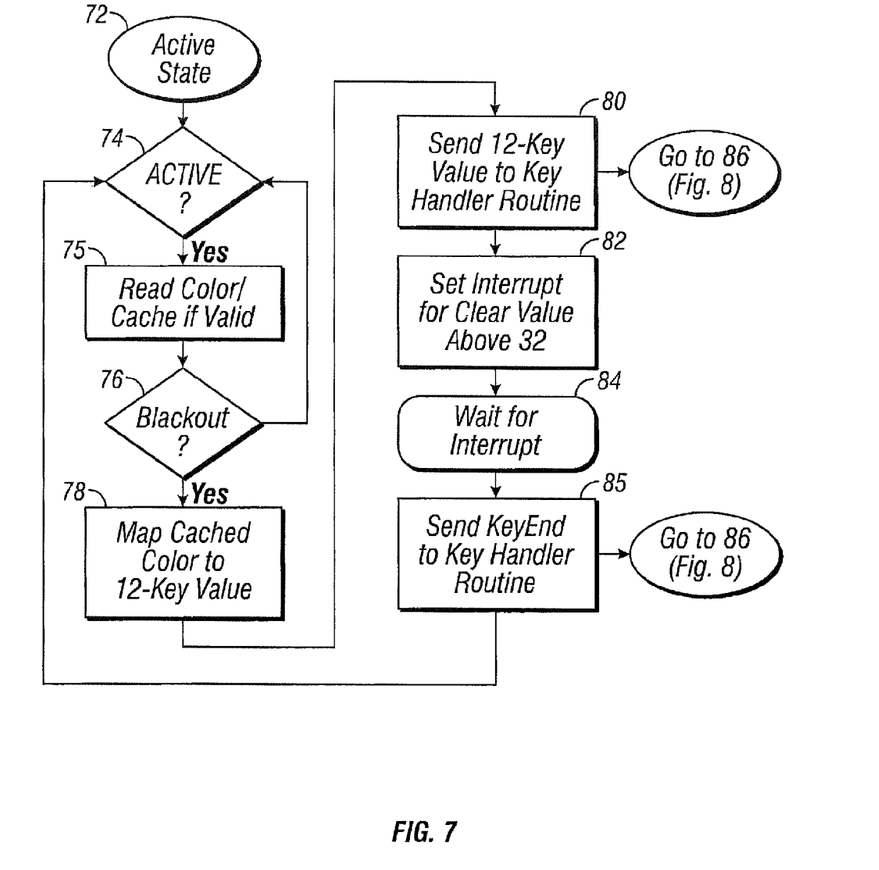
FIG. 7 is a flow diagram illustrating an active state flow diagram of the sensor and processor unit of FIGS. 1A to 3 while a user is actively tapping finger keys to enter numbers or text.

FIG. 7 illustrates the method of detecting a sensor output signal as emitted by the color sensor 20 a result of sensor detection of a finger key color, followed by conversion of the sensor color output signal emitted by the color sensor 20 to the corresponding 12-key value. The finger key segment colors and corresponding 12-key values are initially stored as a look-up table in data storage module 30. When the system enters an active state (72) as a result of the Proximity NEAR interrupt of FIG. 6A, and remains active (74), an incoming color sensor input signal from color sensor 20 (which may be any one of the selected 12 colors of the keys or key flags applied to the finger segments) is read and cached if valid (step 75). As noted above, all color keys are chosen to have at least one RGB component at 255. A reading including one component at 255, scaled appropriately based on the value of the clear signal, is the basis of validation in step 75.

A blackout occurring after this reading (step 76) indicates that the human finger has sealed the top of the sensor cavity, blocking all light, or that a mechanical or capacitive switch adjacent the sensor has been activated by the sensor unit tapping the finger segment. In other words, a blackout indicates that the user has tapped the finger segment carrying the detected color key. Where a mechanical or capacitive switch is used for this function, it is located adjacent or under the color sensor, or may be deployed in a ring around the sensor cavity, respectively. If no blackout is detected after a color sensor reading in step 76, the system returns to step 74 to determine if the system is still in an Active state, and if so, the color sensor output is read again, until a blackout occurs. If a blackout is detected at step 76, the cached color is mapped to the corresponding 12-key value, using the table of 12-key values and associated colors stored in the data storage module (step 78). The determined 12-key value is then sent to the key handler module 32 (step 80), which performs the key handler routine illustrated in FIG. 8 and described in more detail below. The key handler routine is similar or identical to key handler routines carried out in any phone having a 12-key input keypad. An interrupt is set for clear value above 32 (82) as a result of the user moving the thumb, and thus the attached color sensor, away from the finger segment. Prior to step 82 in the flow chart, the sensor is in total darkness, since it is in full contact with the person's skin, which is blocking the light. The color sensor monitors the "clear" or unfiltered part of the sensor, i.e. the amount of light that crosses a configured threshold, and provides an output or Interrupt signal (step 84) as soon as a small amount of light, specifically a color value over 32, is seen. The "clear" value interrupt signal is provided by the color sensor, at step 84.

When a sensor CLEAR interrupt signal is received following a blackout, this indicates that the user has tapped the key once and moved their thumb away from the key/finger segment. A KeyEnd signal is then sent to the key handler routine (step 85), and the system returns to an Active state in step 74 to wait for the next finger tap detection. In this way, rather than using the microcontroller to do continuous reading of the sensor while waiting for the thumb to lift, power is saved during the time the thumb is in contact with the finger segment. The KeyEnd signal is used by the key handler routine (FIG. 8) to determine when a key is held down rather than briefly tapped.

Figure 8:
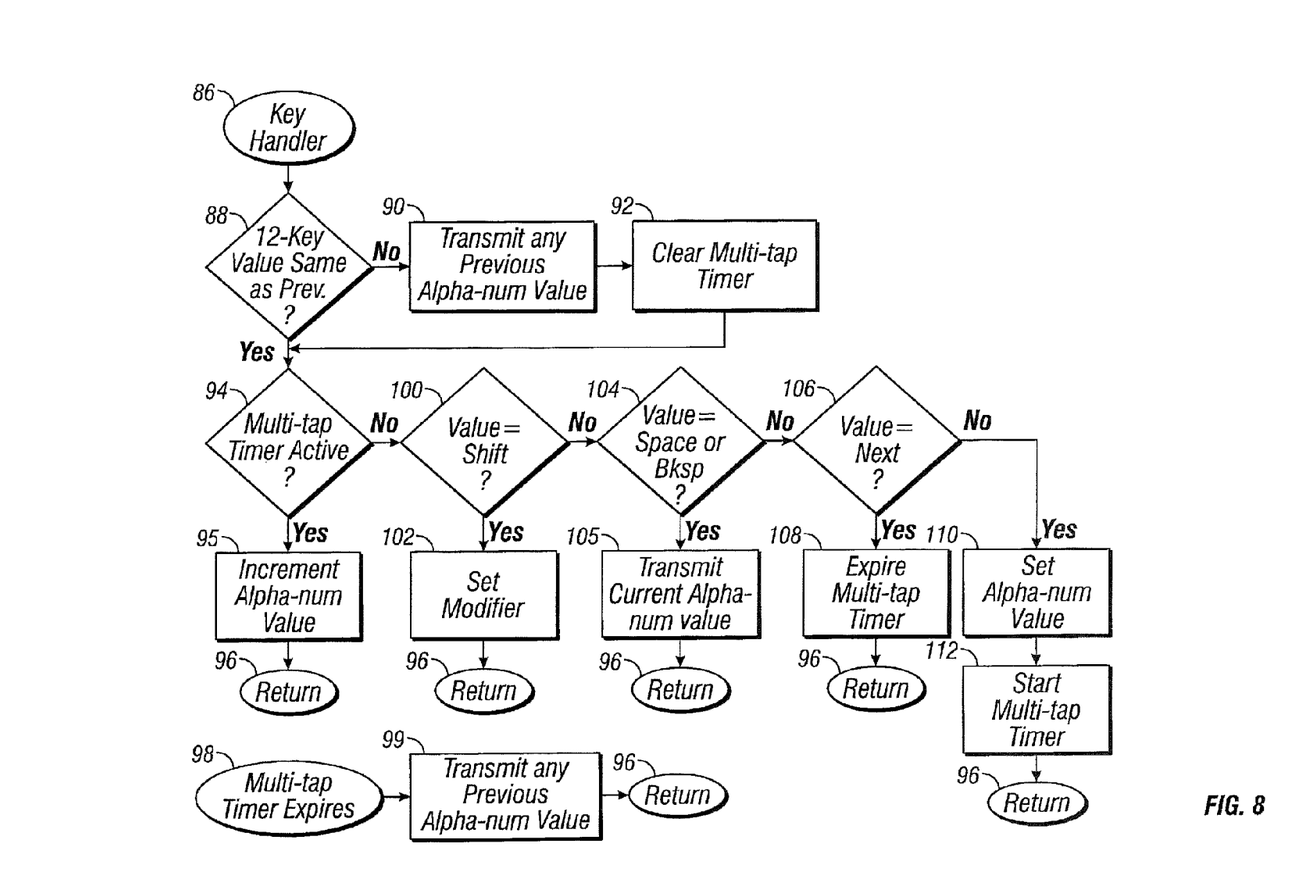
FIG. 8 is a flow diagram illustrating an embodiment of a multi-tap input flow chart configured to produce an alphanumeric output value based on a series of multi-tap inputs on the finger keypad of FIG. 1.

The key handler module receives a 12 key value and "key end" input from the sensor input and converter module 28 at step 86, as illustrated in FIG. 8, and first determines whether the detected value is the same as the previously received value (88), indicating that the user has tapped the same key more than once. If the received 12 key value is different from the previously received 12 key value, any previously determined alphanumeric value is transmitted (90), and the multi-tap timer is cleared (92).

If the received 12-key value is the same as the previous 12-key value, and the multi-tap timer is active (94), the alphanumeric value for that key is incremented to the value corresponding to two key taps on the same key (95), followed by a return (96) of control back to the finger keypad converter module 28. If the multi-tap timer expires (98) at any time, any previously determined alphanumeric value is transmitted (99).

If the multi-tap timer is not active and the value for the key received from the finger keypad converter module 28 corresponds to a shift (step 100), a text modifier is set in step 102 (e.g. caps, num lock, etc.). If the received 12 key multi-tap value corresponds to space or back space (104), this value is immediately transmitted (105). If the received 12-key multi-tap value corresponds to "next" (106), the multi-tap timer is immediately expired (108), causing the system to execute steps 98 and 99. "Next" is typically on the zero-key of 12-key handsets which support a single-tap "rapid entry" text solution (e.g. T9, eZi, and the like). The "next" key is generally used to cycle through multiple valid words representing the combination of keys pressed.

This embodiment allows the use of the "next" key in multi-tap mode (i.e. single tap on 0 key in alpha entry mode=NEXT). Typically, "next" has no meaning in "multi-tap" mode, but in order to make the finger keypad fully deterministic, the "next" key instantly fires the multitap timer, advancing to the next character position. This helps when typing words such as "feed" where the same key is used for sequential letters. Without this step, the user must wait for the multi-tap timeout to expire before the same key can be pressed for the next letter. If the user wants to type fast, and the cursor on the screen did not yet advance to the next position, errors or typos can occur. The "next" key handling built into the key handler software of FIG. 8 reduces the risk of such typos when using the finger keypad, where the user may or may not be using the display screen 36 of FIG. 4 to see what they are typing. Thus, to type two identical letters quickly, such as EE, the key for the first letter E is typed (tap the number 3 key twice), then the 0 key is tapped once, then the same letter key (number 3 key tapped twice in the case of EE) is typed again.

If the multi-tap value for the 12-key input does not correspond to any of the key values in steps 102, 104 or 106, the alpha-numeric value corresponding to the 12 key multi-tap input is set (110), and the multi-tap timer is started (112). The multi-tap timer is the amount of time set for the user to re-tap the same finger segment, similar to such timers as used on a conventional mobile phone 12-key keypad.

The finger keypad output control system and method of FIGS. 5 to 8 is described above in connection with the finger keypad system of FIGS. 1 and 2 which uses a thumb-mounted color sensor to detect different colors of flags applied to the respective finger segments in order to distinguish between keys of a 12-key keypad. However, in alternative embodiments, substantially the same system may be used regardless of the type of receptor or detector device used to detect and distinguish between thumb taps on different finger segments associated with the 12 keys, and regardless of whether or not there is any actual key element or flag on the finger segment itself. In some alternative embodiments, key flags applied to the finger segments may be discriminated by characteristics other than color, for example, by insignia such as bar codes or the like.

In other embodiments, the fingers are completely unmarked and various physical or physiological criteria may be used to distinguish between thumb taps on the different finger segments. As in the first embodiment, the finger segments are assigned the respective 12-key values indicated in FIG. 1 and various different types of sensors may be used to distinguish variations in physical or physiological characteristics resulting from the thumb tapping different finger segments. The system in these cases may be calibrated in advance with the different sensor output signals resulting from tapping different finger segments associated with the respective 12-key values assigned to the respective finger segments. In one such embodiment, the detector or receptor device may be a camera or optical sensor worn on the thumb, for example on ring 120 in place of color sensor 20, on ring 122, or on the wrist, such as a fish-eye camera configured to differentiate between finger segments based on watching the whole hand as the thumb moves towards a particular finger segment, or by processing the still image at the time a finger segment is touched. In another embodiment, a 3-D depth sensor may be worn on the wrist, for differentiation between finger segments based on watching the whole hand and detecting the thumb movement. The motion sensor may be similar to the Kinect® sensor developed by Microsoft and used for the X-Box.

In another camera based embodiment, a thumb worn, high resolution camera may be used to distinguish between finger segments based on finger print information obtained from the user during setup, i.e. finger prints of each finger segment. The microprocessor has stored finger prints for each finger segment and the associated 12 key value for each finger print, and can determine the 12 key value based on the image received from the camera when close enough to the key tap position. As in the previous, color sensor-based embodiment, a blackout occurs when the camera touches the finger segment, as in step 76 of FIG. 7, and this is used to determine when a cached finger segment image should be mapped to the corresponding 12-key value. A similar, fingerprint based differentiation of the finger segments may be achieved with a thumb-worn biometric sensor in place of the color sensor 20 of the first embodiment.

In another embodiment, the sensor 20 may be a wrist worn acoustic array for differentiation of finger segments based on the sound of the thumb hitting different finger segments, or on the sound of tendon movement as a result of the thumb tapping the different finger segments, as determined by prior calibration on set up by the user. Another alternative is a sensor device comprising wrist-worn electrodes for differentiation of finger segments based on myoelectric muscle signals, similar to those used in modern prosthetic hands and the like.

Other types of sensor which may be used in the finger keypad system in place of the color sensor and without any keys on the fingers are: a thumb-worn capacitive sensor for differentiation of finger segments based on differences in capacitance; a thumb-worn sender and sensor for differentiation of finger segments based on detected electrical resistance between the sender and sensor; a thumb worn sender and sensor for differentiation of finger segments based on RF path loss; a thumb-worn accelerometer and gyroscope for differentiation of finger segments based on changes in thumb position; and thumb-worn piezo-resistive fibers for differentiation of finger segments based on changes in thumb position. In another embodiment, a 12 key keypad may be provided by means of electrical contacts on the finger segments of a glove worn by the user and connected to electrical control circuitry located elsewhere on the glove, and the sensor may be a contact also connected to the control circuitry and worn on the thumb, so that the thumb contact touching a finger segment closes a respective circuit and thereby provides an indication of the 12-key value corresponding to the touched finger segment.

In the foregoing method and system, the 12 segments of the human fingers are used as a 12 key keypad for use in a multi-tap or predictive system to convert detected 12-key values to text, with a thumb-wearable entry or receptor device for entering numbers and letters, so that a user does not have to use the qwerty keypad on a mobile smart phone or tablet computer to enter text, but can respond to incoming text messages or enter notes in a meeting or the like without having to retrieve their phone or tablet from a purse, backpack, briefcase, or the like. When combined with a wrist worn display screen, this makes it easy to respond to incoming messages with only one hand, while carrying items, pushing a shopping cart, or the like. It also makes it possible to type without needing a hard surface to rest on. The sensor based, wearable keypad entry device is worn on the thumb so it is ready to use, but does not impede the use of the hands or limit use of the thumb, and is compact and unobtrusive.

In one embodiment, actual keys or markings are provided on the finger segments or a glove or other device worn on the fingers, either for ease of use for the user while familiarizing themselves with the finger keypad, or for detection by a sensor device worn on the thumb in order to differentiate between different finger segments. In other embodiments, no markings or attachments are required on the finger segments, and the sensor or receptor device discriminates between finger segments in other ways, for example using actual detection of thumb movement to the finger segment with a camera or the like, or by detecting existing physiological characteristics which vary as the thumb taps different finger segments, for example, fingerprints, resistance, capacitance, tendon movement, myoelectric muscle signals, and the like. This has the advantage that the user is always ready to use the finger keypad prior to text entry, without having to attach any devices or markings to the finger segments.

In the embodiments described above, the finger keypad system acts like a wireless communication device and transmits alphanumeric signals to another wireless communication device, such as cell phone 35, display screen device 36 of FIG. 4, tablet 43, or a remote personal computer or the like, and the signals can be directly converted into text displayed on a screen which may be worn on the wrist, or saved for future use.

Although the key handler module or software 32 is provided as part of the control unit 24 of the finger keypad system of FIGS. 1 to 8, it may alternatively be provided in cell phone 35 in alternative embodiments, with a suitable plug-in added to the phone to allow the phone to produce alphanumeric signals based on a wireless signal of the detected 12-key value received from the finger keypad system. However, the system of FIGS. 1 to 8 has the advantage that it can be used with a conventional smart phone or other wireless communication device without requiring any modification of that device. The system and method of the above embodiments allows for one handed text entry without looking at the keys. The user can enter text at high speed in any location, whether standing up, moving, or sitting, and does not need to retrieve their phone in order to send a text message. While typing by tapping finger segments with their thumb, they can look at the output on a wrist-worn display screen, rather than looking at the input device or a small display on a mobile phone. Increase of input speed on the finger keypad over time can be expected as the finger segment key positions are learned, as with any keyboard learning system. This allows texting to become a seamless extension of the user's daily routine. The user can conveniently send text messages and respond to incoming text messages with one hand only, without touching their phone. Since wireless communication to a remote device can take place without touching a phone, a larger, more tablet like device than conventional mobile phones can be used for receiving and storing the text input, since the text receiving device does not need to be carried in a quickly accessible manner. This is ideal for the professional or student who wants to travel light (i.e. not carry a laptop), yet have typed notes without the need for later transcription. The individual can communicate with a mobile device, laptop, or the like at a different location by use of the finger keypad, and proceed to quickly enter notes during a conference, meeting, lecture or the like using only one hand as a finger keypad and entry device.

The wearable text entry device 16 along with a wrist-worn display screen allows users to respond to incoming messages received on their wearable display screen quickly and easily, without needing to retrieve their phone or tablet from their purse or backpack. The finger keypad system allows users to respond with only one hand while carrying items, pushing a shopping cart, traveling in a car or train, or wherever they are at the time a message or update is received. Typical users learn to type quickly on the finger segments, using muscle memory, and can type without looking, by naturally giving different tactile feedback for each key, and a deterministic outcome for any key sequence which reduces the need for proof reading. Most users are familiar with a 12 key phone input, so the system described above leverages what the user is already familiar with to minimize learning curve. The thumb-wearable keypad entry device 16 in the above embodiment is compact and unobtrusive when worn, and does not impede full use of the hand, including the thumb. It may be worn at all times so it is ready to use, or may be quickly slipped over the thumb as needed.

Figure 9:
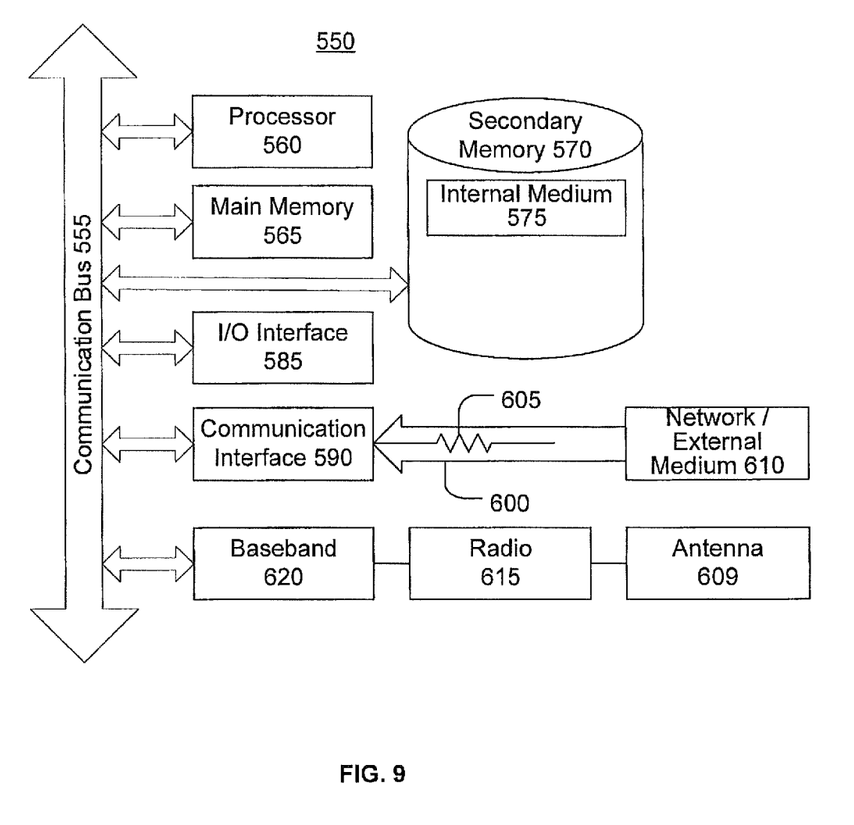
FIG. 9 is a block diagram illustrating an example processor based system that may be used in connection with various embodiments described herein.

FIG. 9 is a block diagram illustrating an example of a computer system 550 that may be used in connection with various embodiments described herein. For example, the computer system 550 may be used as the microprocessor or central processing unit 24 which receives the output of the sensor device used to detect and differentiate between taps on different finger segments in the embodiments described above, and which determines the corresponding 12-key values and alphanumeric key values, and controls transmission of the determined alphanumeric key values to a wireless communication device. However, other computer systems and/or architectures may be used, as will be clear to those skilled in the art.

The computer system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the computer system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 565 and may also include a secondary memory 570. The main memory 565 provides storage of instructions and data in a computer readable medium for programs executing on the processor 560, such as the programs illustrated in the flow diagrams of FIGS. 5 to 8 and described above, and the cached map of key color and 12-key values, and the corresponding alphanumeric values and controls. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a hard disk drive which has an internal storage medium (hard disk) 575 and/or a removable storage drive for receiving a removable storage medium.

In alternative embodiments, secondary memory 570 may include other similar means for allowing computer programs or other data or instructions to be loaded into the computer system 550. Such means may include, for example, an external storage medium and interface 585. Examples of an external storage medium may include an external hard disk drive or an external optical drive, or an external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units and interfaces, which allow software and data to be transferred from the removable storage unit to the computer system 550.

Computer system 550 may also include a communication interface 590. The communication interface 590 allows software and data to be transferred between computer system 550 and external devices 610 (e.g. printers, external storage media), networks, or information sources. For example, computer software or executable code may be transferred to computer system 550 from a network server via communication interface 590. Examples of communication interface 590 include a modem, a network interface card ("NIC"), a communications port, a PCMCIA slot and card, an infrared interface, and an IEEE 1394 fire-wire, just to name a few. Communication interface may also comprise Bluetooth or other wireless communication interface 34 of FIG. 3.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the computer system 550 to perform the various functions of the embodiments described above.

In this description, the term "computer readable medium" is used to refer to any non-transitory computer readable storage media used to provide computer executable code (e.g., software and computer programs) to the computer system 550. Examples of these media include main memory 565, secondary memory 570 (including hard disk drive), and external storage medium 610, and any peripheral device communicatively coupled with communication interface 590 (including a network information server or other network device). These non-transitory computer readable mediums are means for providing executable code, programming instructions, and software to the computer system 550.

In an embodiment that is implemented using software, the software may be stored on a computer readable medium and loaded into computer system 550 by way of the removable storage drive, interface 585, or communication interface 590. In such an embodiment, the software is loaded into the computer system 550 in the form of electrical communication signals 605. The software, when executed by the processor 560, preferably causes the processor 560 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The system 550 also includes optional wireless communication components that facilitate wireless communication over a voice and over a data network. The wireless communication components comprise an antenna system 609, a radio system 615 and a baseband system 620. In the communication device 550, radio frequency ("RE") signals are transmitted and received over the air by the antenna system 609 under the management of the radio system 615.

In one embodiment, the antenna system 609 may comprise one or more antennae and one or more multiplexors (not shown) that perform a switching function to provide the antenna system 609 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communication over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 2 decodes the signal and converts it to an analog signal. Then the signal is amplified and sent to a speaker. The baseband system 2 also receives analog audio signals from a microphone. These analog audio signals are converted to digital signals and encoded by the baseband system 2. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 609 where the signal is switched to the antenna port for transmission.

The baseband system 2 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory, or executed upon receipt. Such computer programs, when executed, enable the communication device 550 to perform the various functions of the present invention as previously described. For example, data storage areas 565 may include various software modules (not shown) that perform the various functions of the present invention as previously described.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented method for using finger segments of a hand of a user as a 12-key input device, where one or more processors are programmed to perform steps comprising:

associating each finger segment of each non-thumb finger of the hand with respective successive keys of a 12-key keypad;
detecting a thumb of the hand tapping on a selected finger segment;
determining a 12-key value based on which key of the 12-key keypad is associated with the selected finger segment; and
converting successive 12-key values to corresponding alpha-numeric values.

2. The method of claim 1, wherein the step of converting successive 12-key values to corresponding alpha-numeric values comprises determining the alphanumeric value corresponding to a first tap of the detected 12-key value, detecting any successive taps on the same finger segment within a predetermined time interval, incrementing the alpha-numeric value of the 12-key value for each successive tap of the same finger segment detected within a predetermined time interval, and setting the current alphanumeric value after expiry of the predetermined time interval without detection of additional taps on the same finger segment.

3. The method of claim 2, further comprising monitoring the finger keypad for a subsequent tap of a finger segment after each current alpha-numeric value is set, and repeating the steps of determining the 12-key value and alpha-numeric values for each subsequent detection of the thumb tapping on a finger segment.

4. The method of claim 1, wherein the step of converting successive 12-key values to corresponding alpha-numeric values comprises using predictive analysis to predict words based on the combination of 12-key values determined in a sequence of thumb taps on finger segments.

5. The method of claim 1, further comprising applying different sensor flags to successive finger segments of a hand to represent the twelve keys of the 12-key keypad, the step of detecting the thumb of the hand tapping on a selected finger segment comprising detecting the sensor flag on a respective finger segment with a sensor device when the thumb taps the sensor flag, and producing a sensor output signal which identifies the detected sensor flag.

6. The method of claim 5, wherein the sensor flags are of different colors and the sensor device is a color sensor, and the step of determining the 12-key value comprises converting the sensor output signal to the 12-key value associated with the color flag applied to the tapped finger segment.

7. The method of claim 1, wherein the step of detecting tapping on a selected finger segment comprises detection of a physical or physiological change associated with a thumb tapping a respective finger segment without applying any indicia to the finger segments.

8. The method of claim 1, further comprising directly or indirectly transmitting successive alpha-numeric values to at least one output device.

9. The method of claim 8, wherein the output device comprises display screen worn on the user's wrist, and the received alpha-numeric values are displayed as the corresponding text on the display screen for viewing by the user as the text is typed.

10. The method of claim 8, further comprising directly or indirectly transmitting successive alpha-numeric values to an audio output device, and providing audio feedback for the user based on the corresponding text as it is typed.

11. A finger keypad system using each finger segment of each non-thumb finger of a human hand as one of 12 keys of a 12-key keypad, comprising:

a wearable keypad entry device configured for releasable attachment to a user's thumb or wrist in a vicinity of the non-thumb fingers of the hand and having a sensor device configured to detect the thumb tapping on respective finger segments of the user's four non-thumb fingers and to produce a sensor output signal which varies depending on which finger segment is tapped; and a processor unit comprising a non-transitory computer readable medium having computer executable programmed modules stored therein and a processor communicatively coupled with the non-transitory computer readable medium for executing the programmed modules stored therein;

the programmed modules including a finger keypad converter module configured to be executed by the processor, the converter module configured to receive sensor output signals from the sensor device tapping a finger segment of a human hand and to convert the sensor output signal into a 12-key value corresponding to the tapped finger segment.

12. The system of claim 11, wherein the programmed modules further comprise a key handler module stored in the non-transitory computer readable medium and configured to receive each 12-key value from the finger keypad module and to convert successive 12-key values to corresponding alphanumeric values.

13. The system of claim 12, further comprising a transmitter module configured to transmit the corresponding alphanumeric values to a selected wireless communication device.

14. The system of claim 12, further comprising a wrist-mountable display screen configured for receiving the alphanumeric output values directly or indirectly and displaying the corresponding text on the screen.

15. The system of claim 11, wherein the keypad entry device comprises at least one ring member of flexible material configured for slipping over a user's thumb, the sensor device being mounted on the ring member to face inwards when the device is worn on the thumb.

16. The system of claim 11, wherein the wearable keypad entry device further comprises a thumb mountable member configured for releasable engagement over a user's thumb, and the sensor device and processor unit are both carried by the thumb mountable member.

17. The system of claim 11, further comprising a plurality of key flags configured for applying to respective finger segments of a hand to represent the 12 keys of a 12-key keypad, the key flags having a physical characteristic which is varied for each of the twelve key flags, and the sensor device is configured to detect the physical characteristic of a key flag when tapped by the thumb and to produce different sensor output signals when different key flags are tapped based on variations in the detected physical characteristic of the key flags.

18. The system of claim 17, wherein the physical characteristic is color and the key flags are of different colors, the sensor device comprising a color sensor configured to differentiate between the different colors of the key flags and to send a color output signal corresponding to the detected key flag color to the processor unit.

19. The system of claim 11, wherein the sensor device is configured to detect a physical or physiological characteristic associated with a thumb tapping a finger segment and to produce different sensor output signals based on variations in the physical or physiological characteristic of the respective finger segments when the thumb taps different finger segments.

20. The system of claim 19, wherein the sensor device is selected from the group consisting of thumb movement sensors, cameras, acoustic sensors, electrical resistance sensors, capacitive sensors, tendon movement sensors, electrodes configured to detect myoelectric muscle movement, finger print sensors configured to produce fingerprint information associated with the respective finger segments, electrical contacts, and thumb position sensors.

* * * * *